United States Patent
Chen et al.

(10) Patent No.: US 9,861,925 B2
(45) Date of Patent: Jan. 9, 2018

(54) SMART AIR CLEANER

(71) Applicant: TRANS-IOT TECHNOLOGY CO., LTD., Taipei (TW)

(72) Inventors: Tai-Chang Chen, Hsinchu (TW); Chih-Lung Yeh, Hsinchu County (TW); Kung-Liang Lin, Hsinchu (TW)

(73) Assignee: TRANS-IOT TECHNOLOGY CO., LTD., Taipei (TW)

( * ) Notice: Subject to any disclaimer, the term of this patent is extended or adjusted under 35 U.S.C. 154(b) by 85 days.

(21) Appl. No.: 15/159,143

(22) Filed: May 19, 2016

(65) Prior Publication Data
US 2017/0216755 A1    Aug. 3, 2017

(30) Foreign Application Priority Data
Jan. 29, 2016  (TW) .............................. 105201489 U

(51) Int. Cl.
*B01D 46/44* (2006.01)
*B03C 3/68* (2006.01)

(52) U.S. Cl.
CPC .............. *B01D 46/442* (2013.01); *B03C 3/68* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,577,705 A * | 5/1971 | Sharlit | ............... | B01D 46/0032 55/283 |
| 4,249,463 A * | 2/1981 | Hornby | ................. | B08B 15/023 454/57 |
| 4,658,707 A * | 4/1987 | Hawkins | ............ | B60H 1/00457 454/140 |
| 5,083,558 A * | 1/1992 | Thomas | ................. | A61G 10/02 128/202.12 |
| 5,219,215 A * | 6/1993 | Akagawa | .................. | B01L 9/02 312/1 |
| 5,487,768 A * | 1/1996 | Zytka | .................. | B01D 46/0023 454/187 |
| 5,997,399 A * | 12/1999 | Szatmary | ................ | B08B 15/02 454/187 |
| 6,494,940 B1 * | 12/2002 | Hak | .......................... | A61L 9/16 55/471 |
| 6,703,937 B1 * | 3/2004 | Franz | ................. | B01D 46/0086 340/607 |
| 2007/0012192 A1 * | 1/2007 | Pippel | ................ | B01D 46/0005 96/417 |

(Continued)

*Primary Examiner* — Amber R Orlando
*Assistant Examiner* — Britanny Precht
(74) *Attorney, Agent, or Firm* — WPAT, PC

(57) ABSTRACT

A air cleaner includes a main body, a sensor, a clean module and a fan. The main body further has at least one main body air inlet and at least one main body air outlet. The sensor located inside the main body for detecting air quality of a first air entering the main body further includes at least one sensor's air-inlet and at least one sensor's air-outlet. The clean module located inside the main body is to purify the first air. The fan located inside the main body is to draw the first air into the main body via the main body air inlet. After the first air passes the clean module to form a second air, the purified second air is then sent out of the main body via the main body air outlet.

13 Claims, 4 Drawing Sheets

(56) References Cited

U.S. PATENT DOCUMENTS

| | | | |
|---|---|---|---|
| 2009/0002182 A1* | 1/2009 | Knox | B01D 46/0012 340/628 |
| 2009/0162255 A1* | 6/2009 | Chan | F24F 3/1603 422/169 |
| 2010/0224697 A1* | 9/2010 | Modlin | A01M 1/205 239/102.1 |
| 2011/0126828 A1* | 6/2011 | Wu | A62B 7/10 128/201.25 |
| 2011/0253090 A1* | 10/2011 | Bode | F02M 35/14 123/184.57 |
| 2011/0262114 A1* | 10/2011 | Montgomery | F24F 1/025 392/365 |
| 2013/0327335 A1* | 12/2013 | Ishikawa | A62B 7/10 128/205.27 |
| 2014/0216259 A1* | 8/2014 | Iwaki | F24F 3/166 96/19 |
| 2015/0224437 A1* | 8/2015 | Nygren | G01D 11/245 95/1 |
| 2016/0121251 A1* | 5/2016 | Baek | F24F 3/1603 95/25 |

* cited by examiner

SMART AIR CLEANER

CROSS REFERENCE TO RELATED APPLICATION

This application claims the benefit of Taiwan Patent Application Serial No. 105201489, filed Jan. 29, 2016, the subject matter of which is incorporated herein by reference.

BACKGROUND OF INVENTION

1. Field of the Invention

The invention relates to a smart air cleaner, and more particularly to the smart air cleaner that includes a sensor to detect air quality so as able to activate an air-purifying process in time.

2. Description of the Prior Art

China meteorological administration has revised the haze warning standard by defining the PM2.5 index (<2.5 um/m$^3$) as one of important indexes for broadcasting a warning. Also, the New England Journal of Medicine points out that every 10-μg/m$^3$ increment in PM2.5 would increase the rate of occurrence of lung cancer by 10%, and that of other carcinomas by 5%. The WTO also mentions that every 10-μg/m$^3$ increment in PM10 would increase the fatality rate by 0.2-0.6%, and every 10-μg/m$^3$ in PM2.5 would increase the fatality rate of cardiopulmonary diseases by 6-13%. Since particles in the surrounding atmosphere would jeopardize human's health severely, thus the need in an improved apparatus for purifying or cleaning the air is increased.

However, correct information of air quality in the atmosphere can only be obtained or announced by the environment protection administration, the weather bureau or other related official administrations, and thus people usually cannot have their air cleaners to be turned on in time to lessen the fatal air situation. Therefore, it is inevitable for people to breathe in dangers. Especially, in the case that people are outsides, the air cleaner in the house or office is definitely hard to be turned on anyway.

In addition, though plenty of air cleaners are already seen in the marketplace, yet few of them can really resolve the PM2.5 problem, especially the problem involving nano-scale powders, viruses, bacteria, mold spores, dust mites, feces, and any particle the like. Currently, the electrostatic dust collector is predicted to become the mainstream air cleaner in the near future for having features of high efficiency in filtering out the particles, saving energy, low pressure loss and needing no filter. However, while the electrostatic dust cleaner is in operation, a substantial period of contact time between dusts and electrodes is needed before the cleaning function can be really in action. Thus, the portability of this type of air cleaners is far from being feasible.

The conventional air cleaners currently used in the industry or domestically are usually featured in huge volumes, expensive costs and more space occupations. In addition, those conventional air cleaners usually apply multiple-plate structures or comb structures to increase the aforesaid contact time between dusts and electrodes. However, no matter what kind of the two structures is used, the following clean and maintenance tasks upon these structures are usually troublesome.

Hence, the topic to obtain an improved air cleaner that can be immediately activated upon detecting a poor air quality is definitely crucial now in the art. In particular, the "smart air cleaner" shall be featured in ability to be activated anytime, a reduced volume, well portability, simple operation and a reduced cost.

SUMMARY OF THE INVENTION

In one embodiment of the present invention, the smart air cleaner comprises:

a main body, further having at least one main body air inlet and at least one main body air outlet;

a sensor for detecting air quality, located inside the main body, including at least one sensor's air-inlet and at least one sensor's air-outlet;

a clean module for purifying a first air, located inside the main body; and a fan, located inside the main body, being to draw the first air from the at least one air inlet into the main body, forming a second air after the first air passing the clean module, sending the second air out of the main body via the at least one main body air outlet.

All these objects are achieved by the smart air cleaner described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a smart air cleaner. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
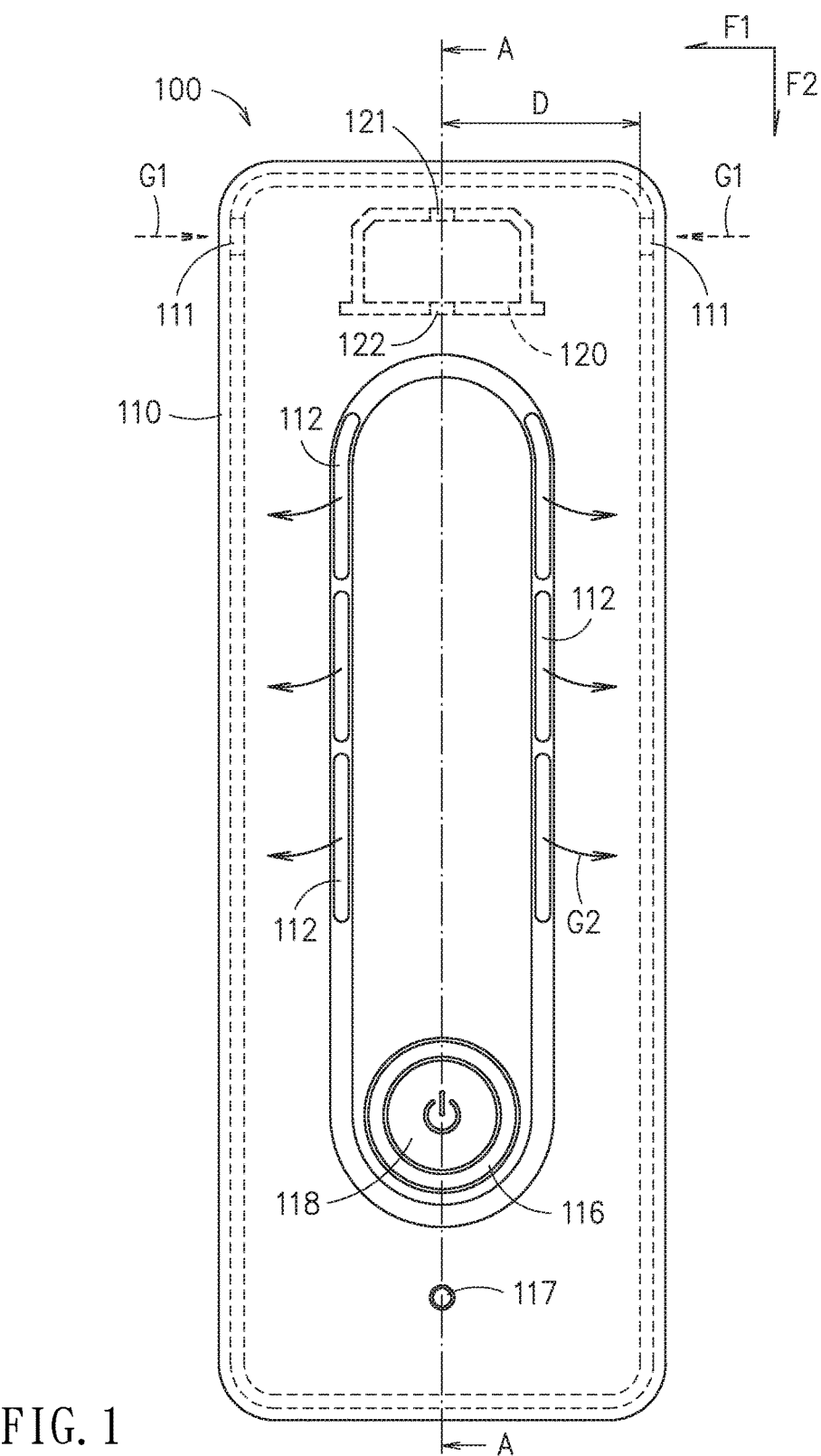
FIG. 1 is a schematic front view of an embodiment of the smart air cleaner in accordance with the present invention.
Figure 3:
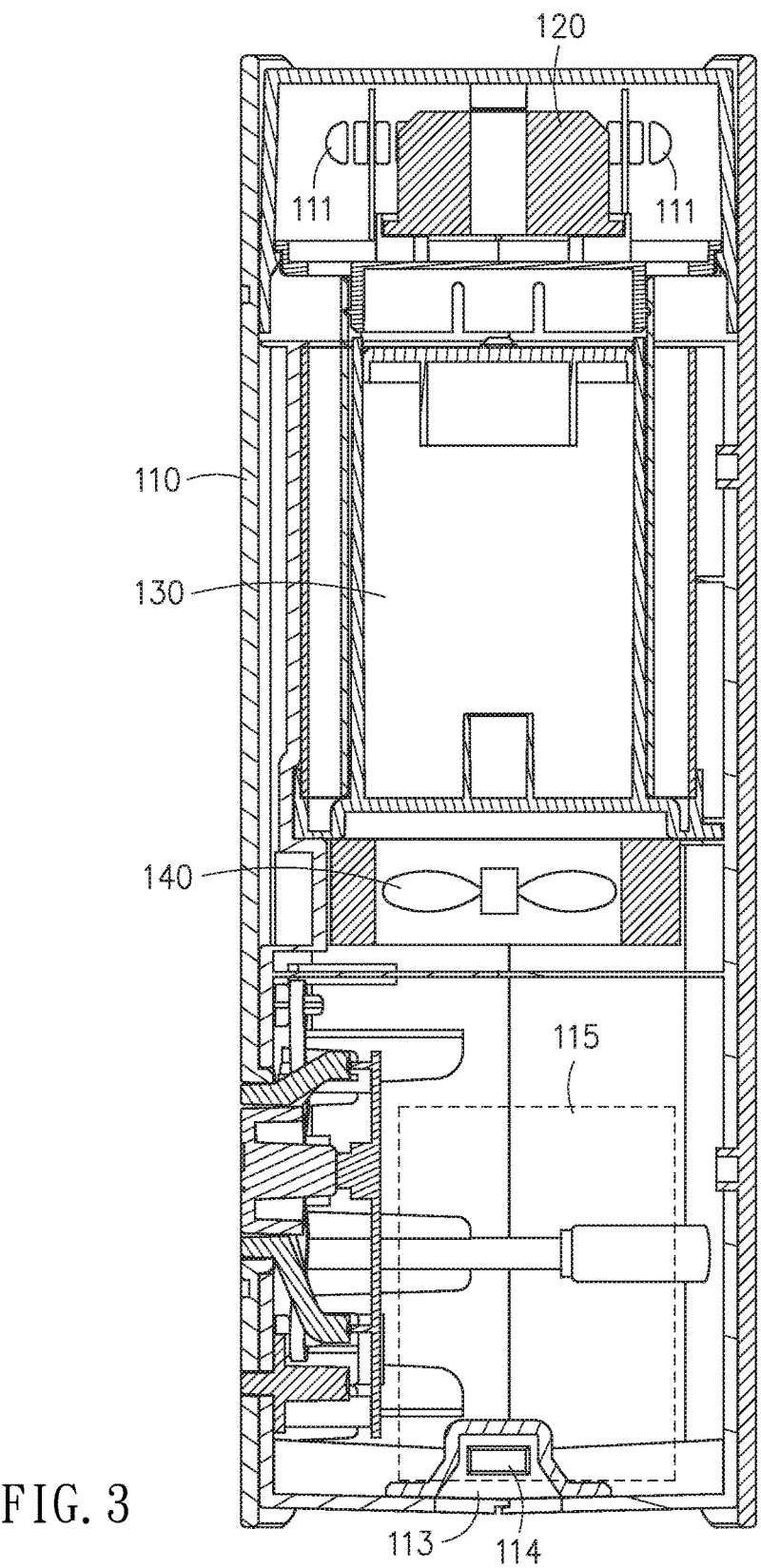
FIG. 3 is a schematic cross-sectional view of FIG. 1 along line A-A.

Referring now to FIG. 1 and FIG. 3, a smart air cleaner 100 includes a main body 110, a sensor 120 located inside the main body 110, a clean module 130 and a fan 140.

Figure 2:
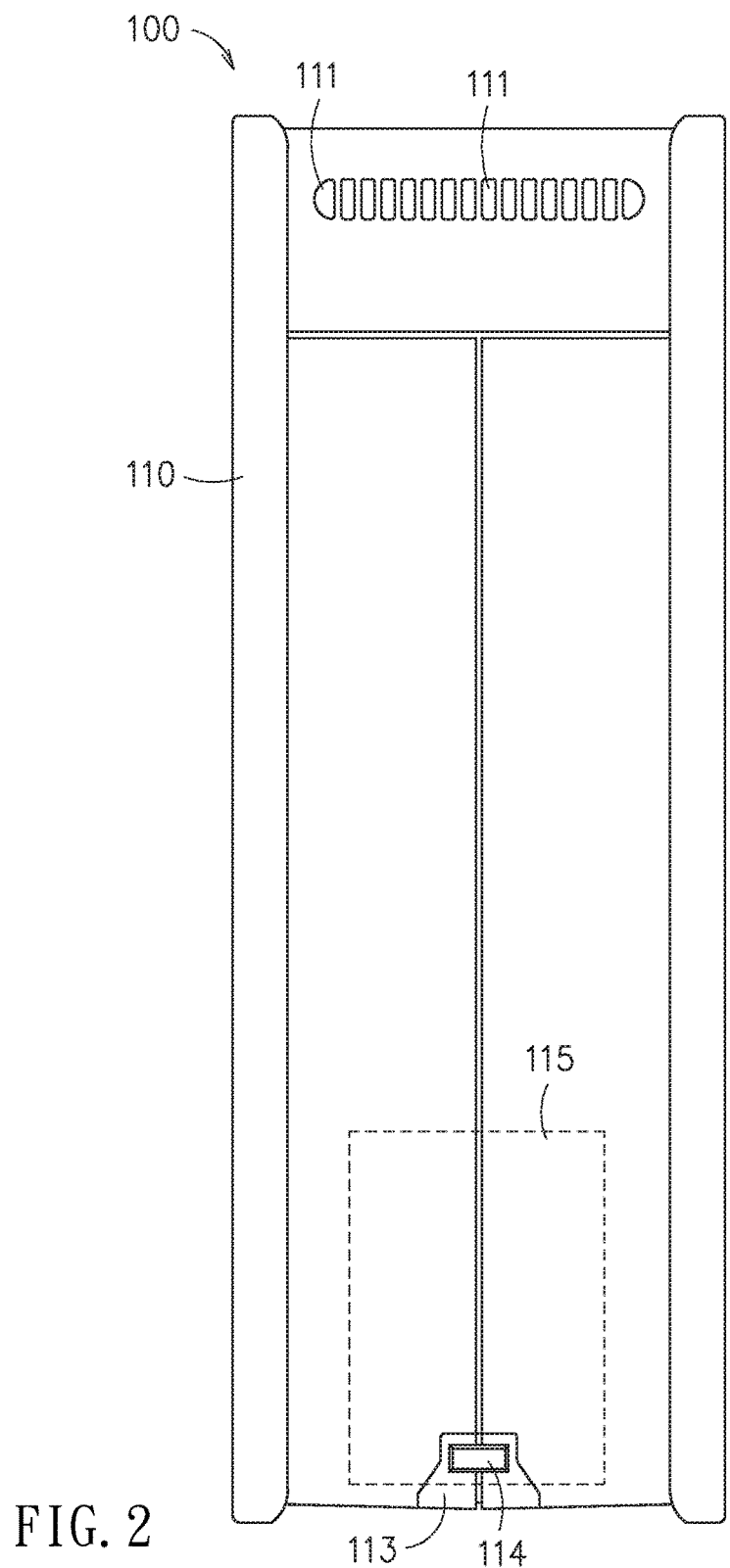
FIG. 2 is a right-hand-side view of FIG. 1.

At a corresponding upper portion of each of the two opposing lateral sides of the main body 110, a plurality of respective main body air inlets 111 is located by penetrating the corresponding side of the main body 110. In FIG. 2, only the main body air inlets 111 located at the right side of the main body 110 are shown. The main body air inlet 111 has a hole size ranging between 0.2~1 cm, without a specific shape. For example, the main body air inlets 111 in FIG. 2 are demonstrated to be either rectangular or semicircular. A first air G1 located outside the main body 110 can be drawn into the main body 110 via the main body air inlets 111 in a diffusion manner or by a fan 140. At a front side of the main body 110, a plurality of main body air outlets 112 is located by penetrating the main body 110, so that a second air G2 inside the main body 110 can be pushed out of the main body 110 via the main body air outlets 112 by the fan 140. As shown, a recess portion 113 is formed at a bottom portion of the right lateral side of the main body 110. The recess portion 113 provides a USB recharge port 114 for connecting a USB recharge cable that is further connected with a foreign power source, and a control module 115 located inside the main body 110. The control module 15 is electrically coupled with the sensor 120, the clean module 130 and the fan 140, and is to control operations of the smart air cleaner 100. Generally speaking, the control module 115 further includes a controller for controlling circuits and the chargeable battery. By connecting the USB recharge cable, the control module 115 can charge the battery such as a chargeable lithium battery. The recess portion 113 can also be used to provide a cable-sorting groove for the USB recharge cable. However, it shall be noted that other types of the recharge ports can also be applicable to the recess portion, not limited to the USB recharge port 114. In addition, a plurality of indicators 116, 117 is located at the front side of the main body 110. According to design purposes, the indicators 116, 117 may serve different functions. For example, the indicator 116 can be an indicator for the power source, while the indicator 117 can be the one for battery capacity. Also, the types and the colors for the indicators 116, 117 can be various. For example, in this embodiment, the indicator 116 is shaped as a ring to encircle the power switch 118, while the indicator 117 is shown to be a point indicator.

Figure 4:
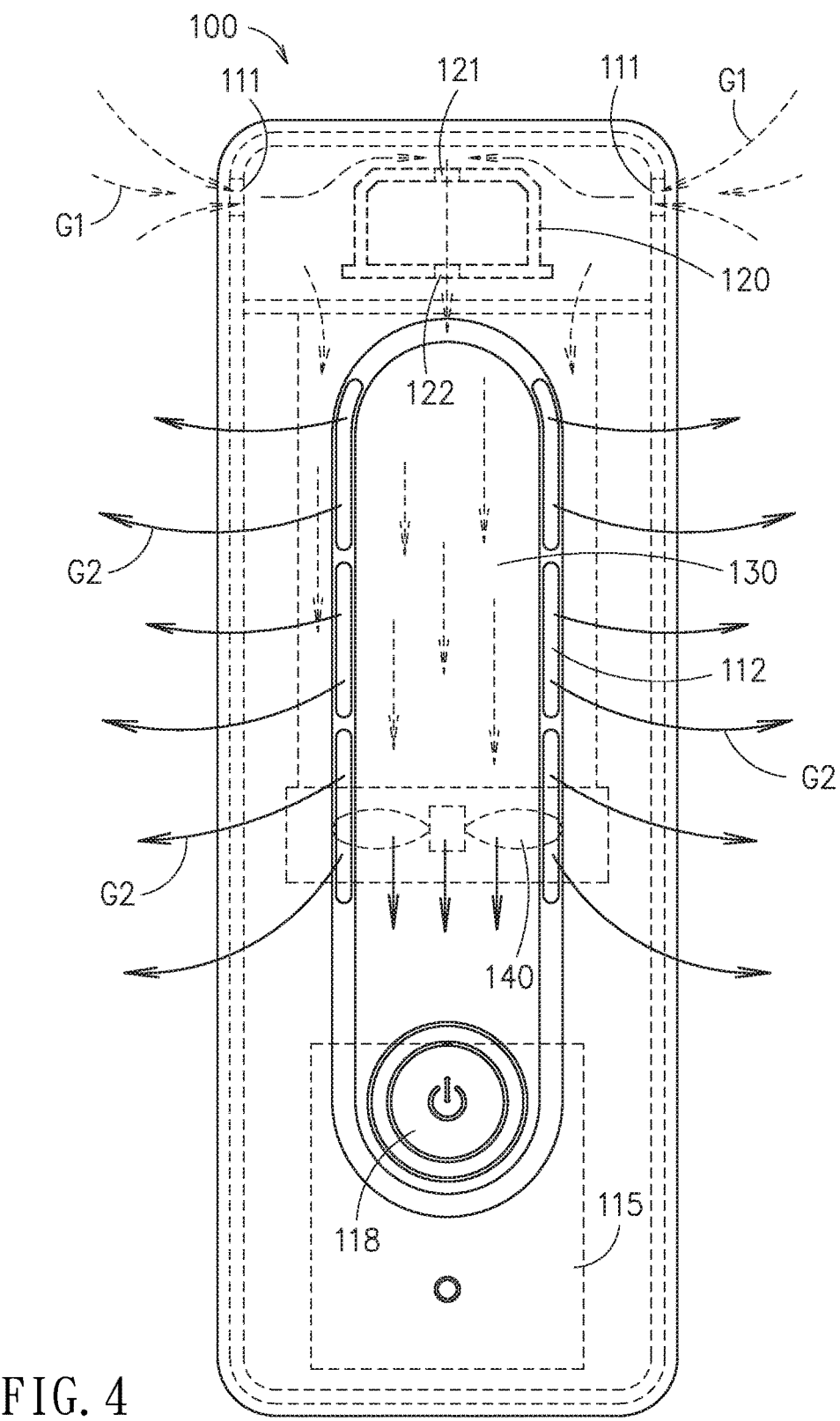
FIG. 4 demonstrates air flows of FIG. 1.

The sensor 120 is to detect the air quality of the first air G1 that enters the main body 110 through the main body air inlets 111. The sensor 120 further includes a sensor's air-inlet 121 and a sensor's air-outlet 122. The locations for the sensor's air-inlet 121 and the sensor's air-outlet 122 are not strictly defined. In this embodiment, the sensor's air-inlet 121 is located at a top of the sensor 120, while the sensor's air-outlet 122 is located at a bottom of the sensor 120. The intake direction F2 of the sensor's air-inlet 121 is perpendicular to the intake direction F1 of the main body air inlet 111. The distance D between the sensor's air-inlet 121 and the main body air inlet 111 is ranged between 1~5 cm. Referring to FIG. 1 and FIG. 4 simultaneously, the first air G1 can enter the sensor 120 via the sensor's air-inlet 121 in a diffusion manner, or in a drawing manner by a fan 140 to pass through the main body air inlet 111 and then the sensor's air-inlet 121. The first air G1 then flows out of the sensor 120 via the sensor's air-outlet 122.

The clean module 130 is to purify the first air G1 that enters the main body 110 via the main body air inlet 111 and that leaves the sensor 120 via the sensor's air-outlet 122. In the present invention, the selection of the sensor 120 depends on the air to be purified. For example, the sensor 120 can be an air-quality sensor for detecting the air quality of the first air G1. Further, the embodiment of the clean module 130 can also be various, such as an electrostatic clean module or any type of clean modules.

Referring now to FIG. 4, air flows of FIG. 1 is demonstrated in details. A user can depress the power switch 118 to turn on or off the smart air cleaner 100. When the surrounding air around the user is not satisfied, then the smart air cleaner 100 can be turned on to work. Firstly, the fan would suck in the first air G1 into the main body 110 via the main body air inlet 111, and then the first air G1 passes through the clean module 130 to form the second air G2. The second air G2 leaves the main body 110 via the main body air outlet 112. It is to say that, when the first air G1 contains particles or the like, a purified and clean second gas G2 would be provided by the smart air cleaner after the first air G1 passes through the clean module 130.

As described above, a control module 115 located inside the main body 110 can couple an application program in an electronic device, such as the mobile phone of the user. The electronic device can couple the smart air cleaner 100 in a Bluetooth means, such that the user can perform reading and analysis of the detected air-quality data at the mobile phone. Also, the user can configure, turn on or turn off the smart air cleaner 100 by the mobile phone. In addition, the detection data of air quality by the sensor 120 can be displayed on the mobile phone. Thus, when the mobile phone shows a situation of inacceptable air quality, the smart air cleaner 100 can be immediately turned on to work. Further, the application program can also be applied to record the data in a cloud manner. In this aspect, the control module 115 can be set to record the air-quality data (PM2.5 for example) detected by the sensor 120 for every predetermined period (10 minutes for example), the mobile phone can then read the data in the control module 115 through the Bluetooth connection between the mobile phone (or a smart portable device) and the smart air cleaner, and then these air-quality data can be uploaded to a cloud-end storage unit for every preset time (1 hour for example). Thus, after a substantial time of usage of the smart air cleaner 100, enough data would be collected to be analyzed so as to establish an optimal operation pattern for individual user of the smart air cleaner.

In summary, by providing the smart air cleaner in accordance with the present invention, since a sensor for detecting the instant air quality is applied and an application program at a portable electronic device is network connected, thus the smart air cleaner of the present invention can achieve objects of ability to be activated anytime, a reduced volume, well portability, simple operation and a reduced cost.

While the present invention has been particularly shown and described with reference to a preferred embodiment, it will be understood by those skilled in the art that various changes in form and detail may be without departing from the spirit and scope of the present invention.

What is claimed is:

1. A smart air cleaner, comprising:
a main body, further having at least one main body air inlet and at least one main body air outlet, wherein said at least one main body air inlet is located at an upper portion of said main body;
a sensor for detecting air quality, located inside the main body and adjacent to said at least one main body air inlet, including at least one sensor's air-inlet and at least one sensor's air-outlet;
a clean module for purifying a first air, located inside the main body and disposed beneath said at least one sensor's air outlet; and
a fan, located inside the main body, being to draw the first air from atmosphere via the at least one air inlet into the main body, forming a second air after the first air passing the clean module, sending the second air out of the main body into atmosphere via the at least one main body air outlet;
wherein said first air is partially drawn through from said at least one air inlet into the main body through said sensor via said at least one sensor's air-inlet and out from said at least one sensor's air outlet to said clean module;
wherein a distance between the sensor's air-inlet and the at least one main body air inlet is ranged between 1~5 cm; and
wherein the main body has a plurality of the at least one main body air inlet, each said main body air inlet has a hole size ranging between 0.2~1 cm.

2. The smart air cleaner of claim 1, wherein the sensor is an air-quality sensor for detecting air quality of the first air.

3. The smart air cleaner of claim 1, wherein the first air enters the sensor's air-inlet in a diffusion manner.

4. The smart air cleaner of claim 3, wherein an intake direction of the sensor's air-inlet is perpendicular to another intake direction of the main body air inlet.

5. The smart air cleaner of claim 1, said at least one main body air inlet comprises a first main body air inlet and a second main body air inlet, wherein said air sensor is located between said first main body air inlet and said second main body air inlet.

6. The smart air cleaner of claim 1, wherein the main body further has a control module located thereinside for control the smart air cleaner.

7. The smart air cleaner of claim 6, wherein the control module couples an application program in an electronic device, the application program controlling the control module and thus the smart air cleaner as well.

8. The smart air cleaner of claim 7, wherein the at least one main body air outlet is located at a front side of the main body, and said first main body air inlet and said second main body air inlet are located at a left side and a right side of the main body.

9. The smart air cleaner of claim 1, wherein the main body further has at least one indicator.

10. The smart air cleaner of claim 1, wherein the main body further has a recharge port.

11. The smart air cleaner of claim 10, wherein the recharge port is a USB recharge port.

12. The smart air cleaner of claim 10, wherein said control module communicates with an external device for providing air pollution information and receiving commands for controlling said smart air cleaner.

13. The smart air cleaner of claim 10, wherein said external device is a cellular phone.

\* \* \* \* \*